June 10, 1941.  E. J. BROBERG  2,244,982
TANK DIVERTING VALVE
Filed Sept. 22, 1939   2 Sheets-Sheet 1
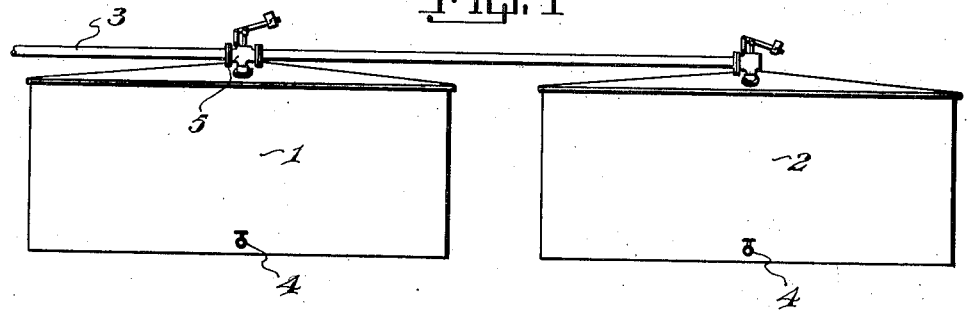
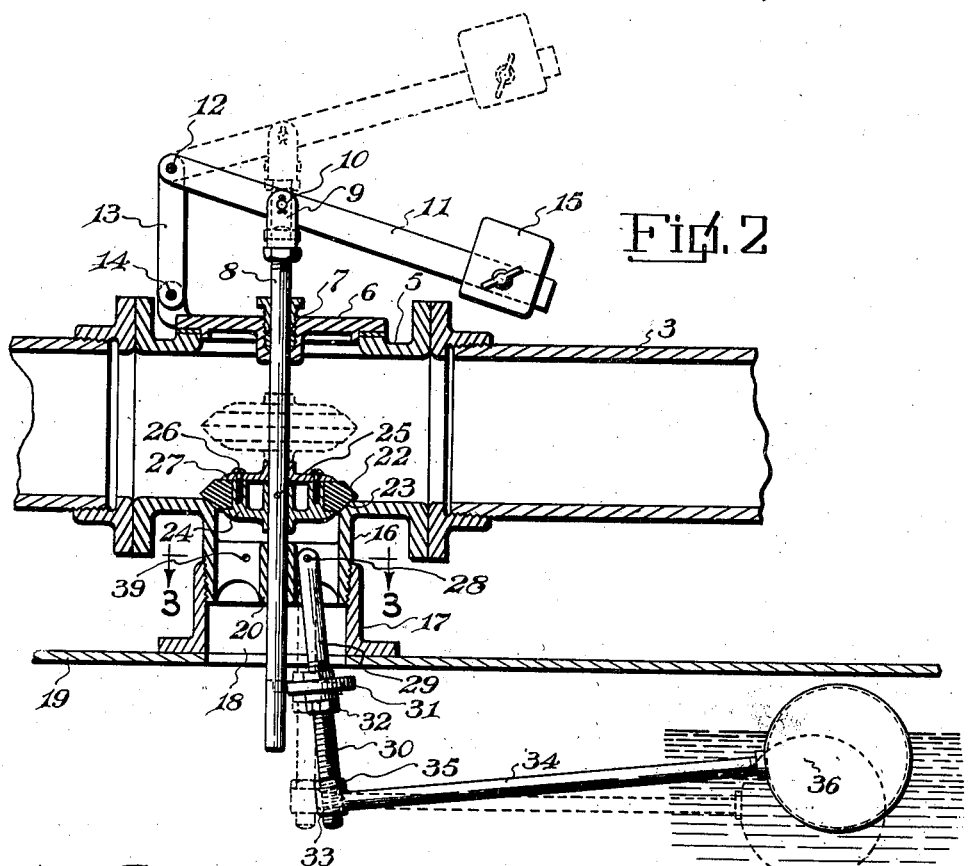
Earl J. Broberg
INVENTOR
ATTORNEY

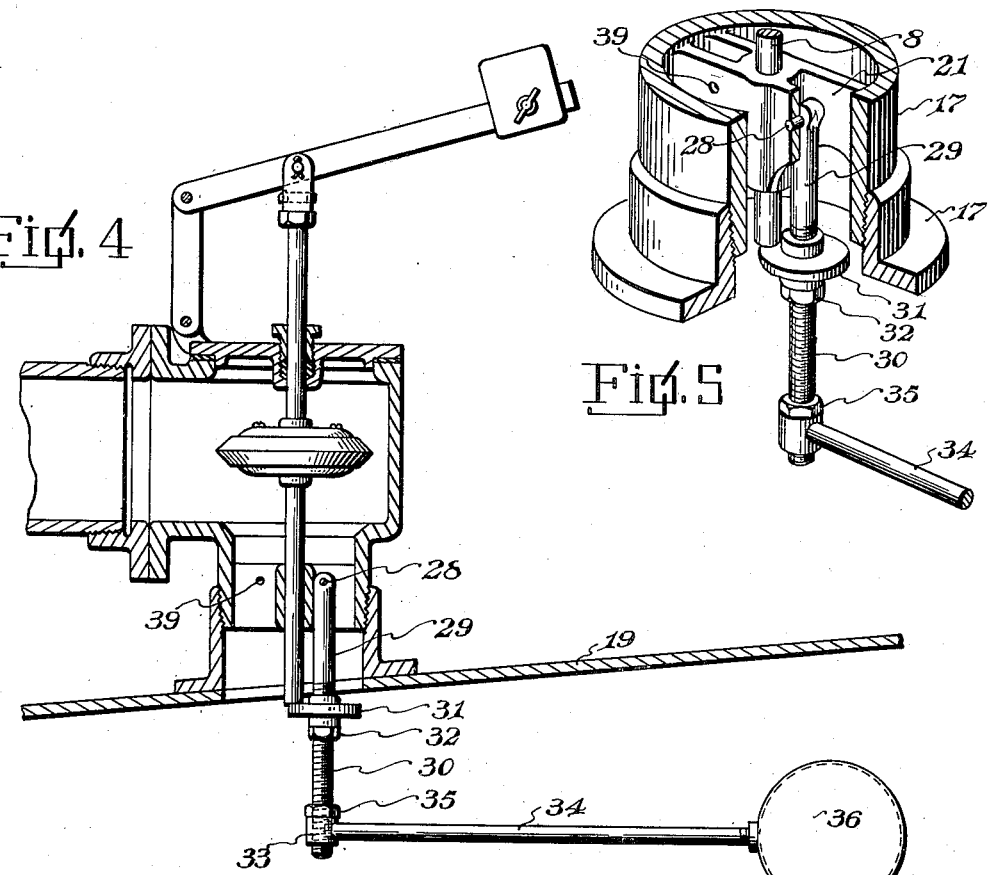
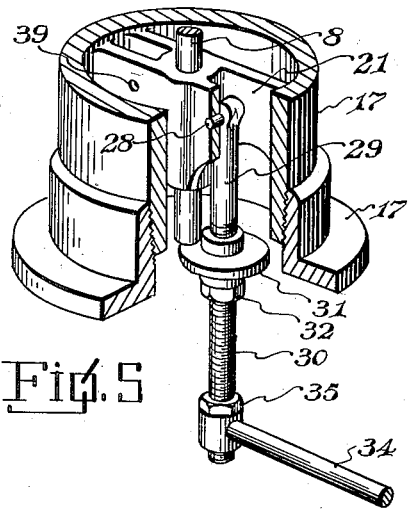
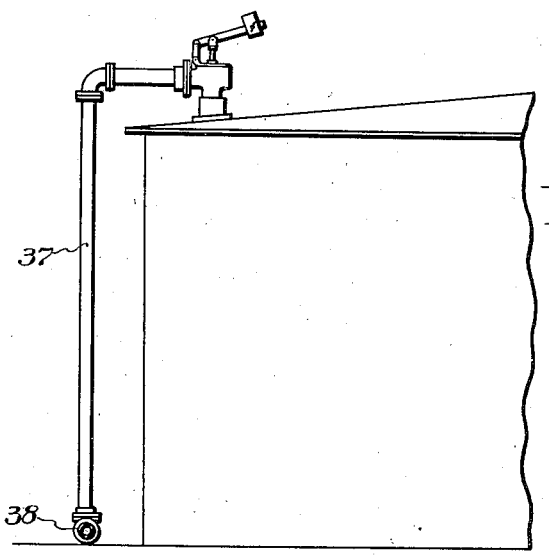

Patented June 10, 1941

2,244,982

UNITED STATES PATENT OFFICE 2,244,982

TANK DIVERTING VALVE

Earl J. Broberg, Tulsa, Okla., assignor to Phil B. Drane, Tulsa, Okla.

Application September 22, 1939, Serial No. 296,151

3 Claims. (Cl. 137—68)

The invention relates to diverting valves for tanks, and particularly adapted for use in connection with tank filling systems, wherein the tanks are supplied with oil, from a single source of power, through a pipe leading to all of the tanks and from which pipe fluid is diverted selectively to any of the tanks.

A further object is to provide a diverting valve, weight and float operated and carried by the pipe line and normally held open by a float arm within the tank and allowed to close when the liquid level within the tank reaches a predetermined position.

A further object is to provide a diverting valve in a pipe line and comprising a casing having a valve therein cooperating with a valve seat in a branch line, leading to a tank, a valve stem carried by said valve and having weight means at its upper end for normally forcing the same downwardly to closed position and a hinged float controlled arm within the tank and having means for engaging beneath the valve stem for holding the same in raised open position against its weight means until released by the float controlled arm when the liquid level in the tank reaches a predetermined position so that the flow of fluid from the supply line through the branch line will be cut off, and the flow through the supply line will continue to the next diverting valve which has been previously set to open position.

A further object is to provide the float controlled arm with an upwardly extending arm hingedly mounted in the branch pipe, and to provide the upwardly extending arm with a valve stem holding disc, which may be adjusted upwardly and downwardly for properly timing the valve releasing operation.

A further object is to adjustably mount the float arm on the upwardly extending arm for additionally adjusting the range of operation of the device.

A further object is to provide a hinged weight lever connected to the upper end of the valve stem for normally forcing said valve stem downwardly, and at the same time forming a handle member whereby the valve may be set in open position or manually opened for allowing further filling of the tank after an automatic closing of the valve incident to the automatic closing of the valve.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a view in elevation of a series of tanks, showing the diverting valves applied thereto.

Figure 2 is a vertical longitudinal sectional view through one of the diverting valves and a portion of one of the tanks.

Figure 3 is a horizontal sectional view taken on line 3—3 of Figure 2.

Figure 4 is a view similar to Figure 2, but showing a dead end structure of valve casing, for instance where the valve is carried by a branch pipe or riser, as shown in Figure 6.

Figure 5 is a detailed perspective view of one of the branch pipes, parts being broken away to show the mounting of the float controlling arm.

Figure 6 is a view in elevation of a portion of a tank, showing the valve carried by a riser from a main line on the ground.

Referring to the drawings, the numerals 1 and 2 designate oil storage tanks which are connected in series by means of a main oil supply line 3, which may lead to any suitable source of oil supply. It is customary to pump oil through the main line 3 to the various tanks for storage purposes and to drain the tanks through valves 4 from time to time.

The diverting valves comprise casings 5. Each casing 5 is provided with a removable inspection plate 6 having a packing gland 7 therein, and vertically slidable in the packing gland 7 is a valve rod 8 terminating at its upper end in a clevis 9, in which is pivotally mounted, at 10, a weighted lever 11. One end of the lever is pivotally connected at 12 to a toggle link 13, which is in turn pivotally connected at 14 to the inspection plate.

The weight lever 11 is provided with a weight 15 adjustably mounted on the lever 11 so the amount of downward pressure may be varied. By providing the toggle link 13, the weight lever will have freedom of movement and will not bind the valve rod 8 in its bearings.

The lower side of the valve casing 5 is provided with a branch pipe 16, which is threaded into the tank flange 17, which surrounds the inlet opening 18 in the upper side 19 of the tank. Disposed within the branch pipe 16 is a bridge member 20 having oppositely disposed spaced webs 21, and in which bridge member the lower end of the valve rod 8 is slidably mounted. The valve rod 8 extends downwardly into the tank and terminates below the upper side 19 thereof. Mounted on the valve rod 18 is a disc valve 22, which cooperates with the valve seat 23 for allowing or cutting off the flow of fluid to the branch pipe and tank. Valve 22 comprises a lower flanged portion 24, which is preferably sweated to the valve rod and additionally secured by means of a pin 25. By this construction, leakage around the valve rod is prevented. Secured to the upper side of the flanged member 24, by means of screws 26, is a clamping flange 27 for securely clamping the resilient disc valve in place. Referring to Figure 1, it will be seen that the diverting valve on tank 1 is in open position while the diverting valve on tank 2 is in closed position. Under these conditions the oil flows through the main line 3 and then passes through the branch pipe 16 of tank 1, and when the tank 1 fills to the proper level, its diverting valve is automatically closed and the oil will then fill tank 2 provided its diverting valve is open.

Pivotally mounted on a transverse pin 28, and between webs 21 of the bridge is the upwardly extending arm 29 of the float lever. The arm 29 extends downwardly and is provided with a threaded portion 30, on which is threaded a disc shaped member 31, which is adapted to engage under the lower end of the valve rod 8, when the liquid level in the tank is below normal and holding the disc valve in unseated position, as shown in Figure 4. The disc valve 31 is held in various adjusted positions by means of the lock nut 32. Threaded at 33 on the lower end of the arm 29 is one end of the float arm 34. By providing this threaded connection the arm 34 may be adjusted upwardly or downwardly for varying the time of operation in relation to the liquid level desired to be maintained in the tank. A lock nut 35 is provided for locking the arm 34 in adjusted position. A float 36 is provided on the outer end of the arm 34, and which float is raised by the liquid within the tank, thereby pivoting the operating lever on the pivotal point 28 for moving the disc 31 out of the path of the lower end of the valve rod 8, for allowing the weighted lever 11 to seat the valve 22 on the seat 23. This operation is shown in dotted and full lines in Figure 2. When it is desired to reset the device, it will only be necessary for the operator to move the weighted lever 11 upwardly until the disc 31 is again in the path of the lower end of the valve rod 8, clearly shown in Figure 4. This manual resetting takes place after the tank has been pumped below the liquid level therein. At times it is desired to add additional liquid to the tank after it has automatically been cut off from the main line. To do this it will only be necessary for the operator to pull upwardly on the weighted lever 11 for unseating the valve 22 for allowing the bypassing of the additional fluid to the tank.

The device shown in Figures 4 and 5 operates the same as in Figure 2, however it is designed for a dead end diverting valve, that is for the end of a pipe line, or for a diverting valve used in connection with a riser 37 leading from a main line 38 which rests on the ground, instead of in the air, as shown in Figure 1. It will be noted that the arm 29 may be pivotally mounted on either side of the bridge member 20 and additional holes 39 are provided for this purpose, therefore the diverting valve may be placed close to the side of the tank, and the float control arm 34 may extend inwardly away from the wall.

From the above it will be seen that a diverting valve is provided for oil tank filling systems, which valve is float operated as well as gravity operated, and the diverting valve may be applied to the tank without materially altering the construction thereof, and the same is simple in construction and may be cheaply manufactured.

The invention having been set forth what is claimed as new and useful is:

1. The combination with a liquid storage tank, a liquid supply line leading to said tank, a valve casing in said line, a branch pipe connecting the casing to the tank and discharging into the tank, a valve seat within the casing, a valve cooperating with said seat and controlling the flow of fluid through the branch pipe, a valve rod carried by said valve and extending through the branch pipe into the tank, weight means for normally forcing said valve rod downwardly and the valve to closed position, of means float controlled within the tank and cooperating with the lower end of the rod for holding the valve unseated when the liquid level in the tank is below a predetermined level and releasing said valve rod when the liquid level in the tank reaches a predetermined level, said float controlled means comprising an arm pivotally mounted within the branch pipe and extending downwardly into the tank and in the plane of the valve rod, an angularly disposed float arm carried by said downwardly extending arm, a float carried by said float arm within the tank, a latching member carried by the downwardly extending arm and adapted to engage the lower end of the valve rod and hold the valve unseated and to release said valve when a predetermined liquid level is obtained in the tank.

2. A device as set forth in claim 1 wherein the rod engaging member carried by the downwardly extending arm is axially adjustable on said arm.

3. A device as set forth in claim 1 wherein the angularly disposed float arm is adjustably connected for upward and downward adjustment on the downwardly extending arm.

EARL J. BROBERG.